United States Patent
Uchikoshi et al.

(10) Patent No.: US 9,141,184 B2
(45) Date of Patent: Sep. 22, 2015

(54) PERSON DETECTION SYSTEM

(75) Inventors: Hideaki Uchikoshi, Kodaira (JP); Seiichi Hirai, Kodaira (JP); Takashi Mito, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 114 days.

(21) Appl. No.: 13/819,494

(22) PCT Filed: Mar. 11, 2011

(86) PCT No.: PCT/JP2011/055737
§ 371 (c)(1),
(2), (4) Date: Mar. 28, 2013

(87) PCT Pub. No.: WO2012/026147
PCT Pub. Date: Mar. 1, 2012

(65) Prior Publication Data
US 2013/0329059 A1 Dec. 12, 2013

(30) Foreign Application Priority Data
Aug. 27, 2010 (JP) ................................ 2010-190862

(51) Int. Cl.
*G06F 3/00* (2006.01)
*G06K 9/00* (2006.01)
(Continued)

(52) U.S. Cl.
CPC ............ *G06F 3/005* (2013.01); *G06K 9/00295* (2013.01); *G06K 9/036* (2013.01); *G08B 13/196* (2013.01)

(58) Field of Classification Search
CPC ....... H04N 5/23219; G06K 9/00221–9/00389; G06K 9/00677; G06K 9/00771; G06K 9/00778; G06K 9/036; G06F 3/005; G08B 13/196–13/19697

USPC ......... 348/143–160, 169–172, 207.99, 207.1, 348/222.1, 231.99–231.9, 239; 382/118; 386/69; 707/3

See application file for complete search history.

(56) References Cited

U.S. PATENT DOCUMENTS

| 7,158,657 | B2 | 1/2007 | Okazaki et al. |
| 2004/0001142 | A1 * | 1/2004 | Kumhyr ........................ 348/143 |

(Continued)

FOREIGN PATENT DOCUMENTS

| JP | 2007-190076 | 2/2007 |
| JP | 2008-176653 | 7/2008 |

(Continued)

OTHER PUBLICATIONS

International Search Report, International Application No. PCT/JP2011/055737, Filed Mar. 11, 2011, Mailed Apr. 5, 2011, ISA/Japanese Patent Office.

*Primary Examiner* — Dennis Hogue
(74) *Attorney, Agent, or Firm* — Brundidge & Stanger, P.C.

(57) ABSTRACT

Detection of a specific person with a specific person detecting system using surveillance cameras installed in various environments has not been successfully accurate. A monitoring system of the present invention includes an image pickup device capturing images, an updating type specified person detection server receiving captured images, extracting image feature quantities therefrom and storing image feature quantities and provisional person information of unspecified persons and the reliability thereof in real time, and a monitor station with an image searching function capable of searching an image afterward, which are connected via a network. The updating type specified person detection server adds the person information to a specified person list during system operation on the basis of an unspecified person list that is updated.

17 Claims, 11 Drawing Sheets

(51) Int. Cl.
*G06K 9/03* (2006.01)
*G08B 13/196* (2006.01)

(56) References Cited

U.S. PATENT DOCUMENTS

2006/0053459 A1* 3/2006 Simerly et al. ................ 725/105
2006/0271525 A1* 11/2006 Sukegawa ........................ 707/3
2008/0080743 A1* 4/2008 Schneiderman et al. ..... 382/118
2009/0087038 A1* 4/2009 Okada et al. .................. 382/118
2009/0185784 A1* 7/2009 Hiroike et al. ................. 386/69
2010/0310134 A1* 12/2010 Kapoor et al. ................ 382/118

FOREIGN PATENT DOCUMENTS

| JP | 2008-305400 | 12/2008 |
| JP | 2009-171296 | 7/2009 |
| WO | 2012-026147 | 1/2012 |

* cited by examiner

FIG. 7A

| REGISTRATION ID 711 | IMAGING TIME 712 | CAMERA ID 713 | STORAGE LOCATION OF IMAGE FEATURE QUANTITY 714 | PERSONAL ID 715 | STORAGE LOCATION OF IMAGE 716 |
|---|---|---|---|---|---|
| 1 | 2010/4/5 10:45 | 1 | 0x1234 | A | 0x4227 |
| 2 | 2010/4/6 10:45 | 2 | 0x1235 | A | 0x4228 |
| 3 | 2010/4/7 10:45 | 3 | 0x1236 | B | 0x4229 |
| 4 | 2010/4/8 10:45 | 2 | 0x1237 | A | 0x4230 |
| 5 | 2010/4/9 10:45 | 5 | 0x1238 | C | 0x4231 |
| 6 | 2010/4/10 10:45 | 3 | 0x1239 | A | 0x4232 |
| 7 | 2010/4/11 10:45 | 2 | 0x1240 | D | 0x4233 |
| 8 | 2010/4/12 10:45 | 3 | 0x1241 | A | 0x4234 |
| 9 | 2010/4/13 10:45 | 2 | 0x1242 | B | 0x4235 |
| 10 | 2010/4/14 10:45 | 5 | 0x1243 | C | 0x4236 |

FIG. 7B

| REGISTRATION ID | IMAGING TIME | CAMERA ID | STORAGE LOCATION OF IMAGE FEATURE QUANTITY | PROVISIONAL PERSONAL ID | RELIABILITY | STORAGE LOCATION OF IMAGE |
|---|---|---|---|---|---|---|
| 1 | 2010/4/8 10:45 | 2 | 0x1237 | A | 100 | 0x2232 |
| 2 | 2010/4/6 10:45 | 2 | 0x1235 | B | 100 | 0x2233 |
| 3 | 2010/4/12 10:45 | 3 | 0x1241 | C | 87 | 0x2234 |
| 4 | 2010/4/5 10:45 | 1 | 0x1234 | A | 78 | 0x2235 |
| 5 | 2010/4/9 10:45 | 5 | 0x1238 | A | 66 | 0x2236 |
| 6 | 2010/4/10 10:45 | 3 | 0x1239 | C | 43 | 0x2237 |
| 7 | 2010/4/11 10:45 | 2 | 0x1240 | D | 34 | 0x2238 |
| 8 | 2010/4/7 10:45 | 3 | 0x1236 | D | 26 | 0x2239 |
| 9 | 2010/4/13 10:45 | 2 | 0x1242 | W | 22 | 0x2240 |
| 10 | 2010/4/14 10:45 | 5 | 0x1243 | E | 4 | 0x2241 |

PERSON DETECTION SYSTEM

TECHNICAL FIELD

The present invention relates to an image search system that searches through image data stored in a database and more particularly, to a system that searches a specified person from face images.

BACKGROUND ART

With increase in the number of incidents of crime and in the intensity of the crimes, the recent years have seen an increasing demand for a video monitoring system using an image pickup device such as surveillance camera, the system serving as a safeguard against crimes. The image pickup devices such as the surveillance cameras have broad utility and hence, surveillance camera systems which include the image pickup devices installed at multiple locations and manage the images captured at the plural locations are spreading. Such surveillance camera systems are operated at various locations such as shopping streets, airports, harbors, and power plants.

On the other hand, since the image pickup devices have become less expensive and easier to install, the image pickup devices are installed at an increasing number of locations. However, a heavier load than ever is imposed on a user responsible for operating the monitoring system for simultaneously monitoring the images captured at the multiple locations. With the purpose of reducing the load on the user responsible for the monitoring operation, there have been developed specific person detection for automatically identifying a person by processing images of the person captured by the surveillance cameras, an image searching technique for searching out the specific person from the images captured and recorded by the surveillance camera, and the like.

Now, referring to FIG. 9, description is made on the structures of devices and processors of a conventional person detection system. FIG. 9 is a block diagram showing a structure of the conventional person detection system. A reference numeral 900 represents a network, reference numerals 901-1 to 901-n represent image pickup devices, a reference numeral 902 represents a monitor terminal, and a reference numeral 903 represents a specified person detection server. In the monitor terminal 902, a reference numeral 921 represents an image display unit, and a reference numeral 922 represents a detected object indicator. In the specified person detection server 903, a reference numeral 931 represents a pre-register and a reference numeral 932 represents a specified person detector. A character 'n' represents a natural number.

A specified person detection system includes the image pickup devices 901-1 to 901-n, the monitor terminal 902, and the specified person detection sever 903 which are connected via the network 900.

The image pickup devices 901-1 to 901-n are imaging devices such as network cameras. The monitor terminal 902 is a an apparatus such as a PC (Personal Computer) which includes a display monitor such as liquid crystal display or CRT, a user input device such as keyboard and mouse, and the like. The network 900 is a communication network such as leased circuit interconnecting individual devices for data communications, intranet, Internet, wireless LAN (Local Area Network) or the like.

In FIG. 9, the image pickup devices 901-1 to 901-n convert the captured images to digital data and output the resultant image data to the monitor terminal 902 and the specified person detection server 903 via the network 900.

The monitor terminal 902 includes the image display unit 921 and the detected object indicator 922. The monitor terminal serves as a user interface which displays the images inputted from the image pickup devices 901-1 to 901-n via the network 900 or messages and the like based on detection signals inputted from the specified person detection server 903 via the network 900.

The image display unit 921 processes the images inputted from the image pickup devices 901-1 to 901-n via the network 900 and displays the resultant images on a display screen of an unillustrated display monitor of the monitor terminal 902.

The detected object indicator 922 responds to the detection signal inputted from the specified person detection server 903 via the network 900 and displays a message indicating the detection of the specified person on the display screen of the display monitor. Further, the detected object indicator 922 outputs an alarm sound indicating the detection of the specified person by means of an unillustrated speaker or the like, thus informing the user of the detection of the specified person.

The specified person detection server 903 includes the pre-register 931 and the specified person detector 932. The specified person detection server 903 is an apparatus such as a computer which includes: a control and operation part such as CPU (Central Processing Unit) or MPU (Micro-Processing Unit, Micro-computer); an internal memory such as RAM (Random Access Memory) or flash memory; and a storage medium such as HDD (Hard Disk Drive).

The pre-register 931 previously registers a face image of a person to be specified. This face image is an image as a collation object image previously prepared and is inputted to the pre-register 931. The face image may be inputted by any of methods of designating a file to save the face image, routing through the image pickup device 901-1 to 901-n, using a digital camera or scanner, and the like.

The pre-register 931 performs an operation of extracting an image feature quantity from the input face image and registering the image feature quantity on a specified person list. The image feature quantity includes: color distribution of the image, distribution of edge pattern composition and the like or combinations thereof, for example. The specified person list is, for example, a database on which information pieces including the name, professional affiliation and the like of the person can be registered in addition to the image feature quantity. The specified person list is stored in the storage medium such as HDD.

The specified person detector 932 performs an operation of searching out a given person from the images inputted from the image pickup devices 901-1 to 901-n via the network 900 and then determining whether or not the searched person is the above-described person to be specified.

Disclosed in a patent literature 1 is a technique in which the feature quantity is extracted from the captured image, whether the feature quantity meets a predetermined condition or not is determined, and the image the feature quantity of which meets the condition is displayed.

CITATION LIST

Patent Literature

PTL1: JP-A No. 2009-171296
PTL2: JP-A No. 2007-190076

SUMMARY OF INVENTION

Technical Problem

The specified person detection system of the conventional mode adapted for person recognition using the face image is applied to entrance/exit control for controlling the opening and closing of door or gate, or the like. Therefore, the system is allowed to capture the face image of the person under advantageous conditions of shooting angle, image resolution, luminous surroundings and the like.

A patent literature 2, for example, discloses a technique which includes: capturing face images at predetermined sites in a store such as in a game hall, comparing the face images for each of the imaging sites and outputting a potential person of misconduct. When the face image is captured, the imaging step can be performed under the advantageous conditions of shooting angle, image resolution, luminous surroundings and the like.

However, this specified person detection system cannot be applied to such a place where the door or gate cannot be installed. In a case where a face image of a person is captured in a given timing, the system may sometimes fail to recognize the person with sufficient accuracies depending upon the conditions of shooting angle, image resolution, luminous surroundings and the like.

FIG. 10 is a graph showing an example of face images varied in detection accuracies depending upon the angle from which the face image is captured. In the graph, the ordinates are the detection accuracies of the face image and the abscissa is the face direction of a person 'A'. Specifically, the abscissa indicates that an image 1013 of frontal face of the person 'A' represents a median and as the face is turned farther away from the front toward the right or left side, the distance from the median increases (face image 1013→face image 1012→face image 1011→face image 1010) or (face image 1013→face image 1014→face image 1015→face image 1016).

In a case where the person 'A' is previously registered as the image of frontal face, there is a general tendency that the images of the person 'A' captured from angles nearer the front have the higher detection accuracies and that the detection accuracy of the image decreases with the increase in angle difference from the front. Therefore, the system is increased in the detection accuracy if not only the image of frontal face (or an image captured from one angle) but also images captured from other angles are registered. This applies not only to the shooting angle but also to the other conditions such as the image resolution and the luminous surroundings. However, if the face images are prepared for each of these many conditions, combinations of the images based on the different conditions increase exponentially and hence, the acquisition of image data takes much time. Consequently, an enormous amount of time is required for pre-registering the face images.

In view of the above problems, the present invention has an object to provide a specified person detection system that is capable of detecting the specified person with increased accuracies during system operation.

Further, the present invention has another object to provide a specified person detection system that negates the need for preparing a large volume of collation object images before the system operation, thus facilitating the introduction of the system.

Solution to Problem

According to the present invention for achieving the above objects, a specified person detection system includes: an image pickup device for capturing images; an updating type specified person detection server receiving the captured images, extracting image feature quantities therefrom and storing the image feature quantities and provisional personal information of unspecified persons and the reliability thereof on a real-time basis; and a monitor terminal with an image searching function capable of searching an image afterward, which are connected via a network. Based on the updated unspecified person list, the updating type specified person detection server adds the personal information to the specified person list during the system operation.

In the specified person detection system of the present invention including the image pickup device for capturing images, the specified person detection server, a database storing the personal information and the monitor terminal, the database includes the specified person list and the unspecified person list; the specified person detection server updates the database by acquiring an image captured by the image pickup device, calculating a degree of reliability for identifying a person in the acquired image by using an image feature quantity extracted from the acquired image, and storing image data of the acquired image on the unspecified person list based on the calculated degree of reliability; and the specified person detection server additionally registers, on the specified person list, the image captured by the image pickup device or the personal information of a person retrieved from the unspecified person list in response to a request from the monitor terminal.

In the specified person detection system of the present invention, the monitor terminal displays, on a display monitor, an additional registration screen including a screen portion for search condition and a screen portion for search through the unspecified person list; displays, on the additional registration screen, a face candidate to be additionally registered on the specified person list based on conditions inputted by a user to the screen portion for search condition and to the screen portion for search through the unspecified person list; and additionally registers the candidate in response to a user's instruction.

Advantageous Effects of Invention

According to the present invention, the specified person detection system can increase the image data of each of the persons on the specified person list automatically or more easily than the conventional systems while the system is operating. Accordingly, the detection system can achieve increased accuracy in the detection of specified person.

Since the detection system of the present invention can build up the specified person list more easily than the conventional systems, the system negates the need for preparing a large volume of collation object images before the system operation. This facilitates the introduction of the system.

BRIEF DESCRIPTION OF DRAWINGS

FIG. 7A is a diagram showing an exemplary specified person list of the specified person detection server in the specified person detection system according to the present invention;

FIG. 7B is a diagram showing an exemplary unspecified person list of the specified person detection server in the specified person detection system according to the present invention;

DESCRIPTION OF EMBODIMENTS

Figure 10:
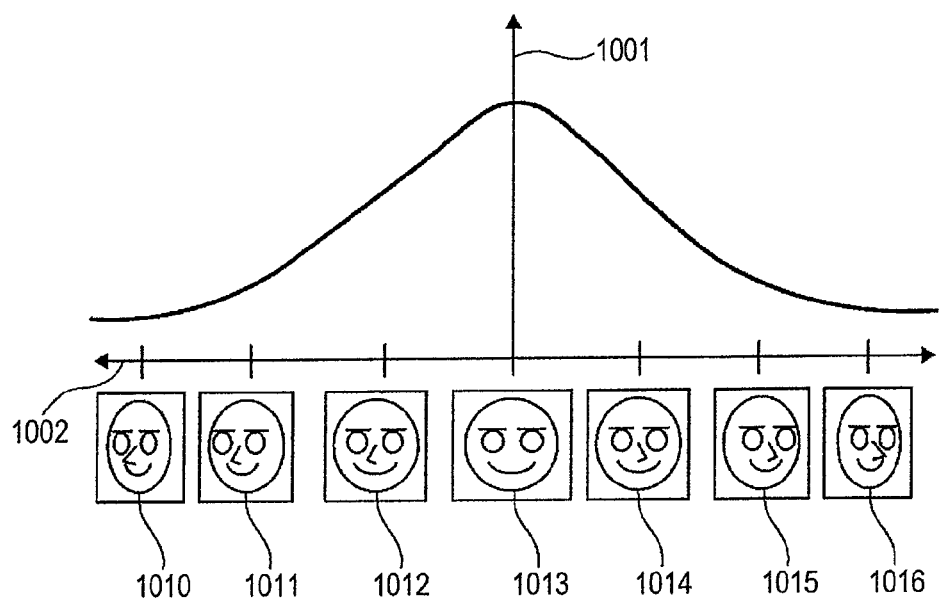
FIG. 10 is a graph showing an example of face images varied in detection accuracies depending upon the angle from which the face image is captured.

As described with reference to FIG. 10 showing the conventional mode, collecting the face images of possible persons at the pre-registration is effective at increasing the accuracy of person detection but takes an enormous amount of time. In this connection, the present invention is adapted to increase the detection accuracy by adding images of a person shot from various angles during the system operation. This applies not only to the shooting angle of the face but also to position of luminous source, makeup and age-related change in face which cause the variations of the face image as well as to face image varied by putting accessories such as glasses. It is difficult to previously prospect such variations of the face image caused by the various factors. Therefore, the present invention seeks to achieve more accurate person detection by sequentially adding and registering the face images during the system operation.

Namely, the present invention has a function to automatically detect a specified person through image processing, thus increasing the accuracy of detecting a specified person.

One example of the present invention will be described as below with reference to FIG. 1 to FIG. 8. In the description of the drawings including FIG. 9 and FIG. 10 illustrating the prior-art techniques, equal or similar reference numerals are assigned to components having same functions, which are explained only once to avoid repetitions.

Figure 1:
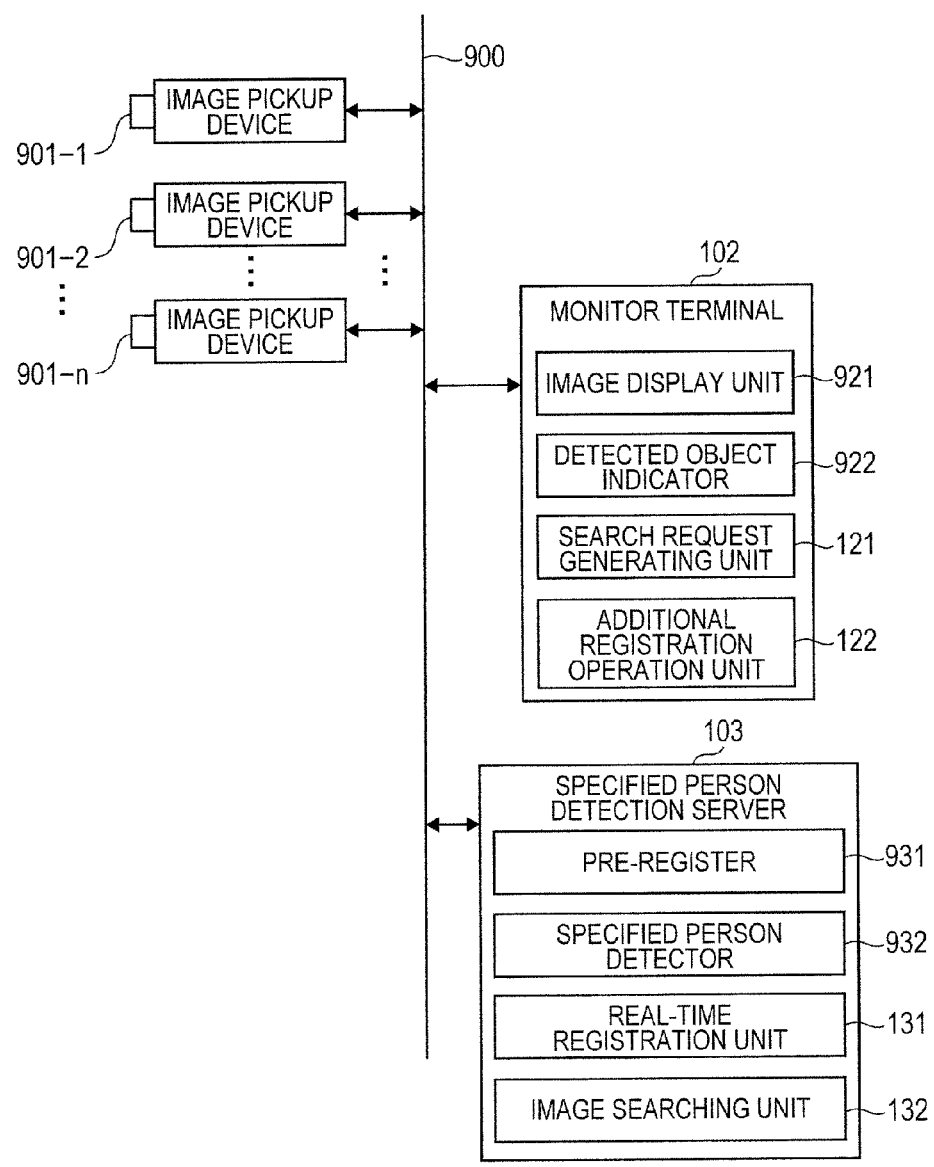
FIG. 1 is a block diagram showing a structure of a specified person detection system according to one example of the present invention.

FIG. 1 is a block diagram showing a structure of a specified person detection system according to one example of the present invention. A reference numeral 102 represents a monitor terminal, and a reference numeral 103 represents a specified person detection server. In addition to the image display unit 921 and the detected object indicator 922 conventionally provided, the monitor terminal 102 further includes a search request generating unit 121 and an additional registration operation unit 122. In addition to the pre-register 931 and the specified person detector 932 conventionally provided, the specified person detection server 103 further includes a real-time registration unit 131 and an image searching unit 132.

The monitor terminal 102 is essentially composed of the image display unit 921, the detected object indicator 922, the search request generating unit 121 and the additional registration operation unit 122, and serves as a user interface displaying the images inputted from the image pickup devices 901-1 to 901-n via the network 900 and messages and the like based on detection signal inputted from the specified person detection server 103 via the network 900. Similarly to the monitor terminal 902, the monitor terminal 102 is an apparatus such as a PC (Personal Computer) which includes a display monitor such as liquid crystal display or CRT, a user input device for operating a GUI (Graphical User Interface) through a keyboard and a mouse, and the like.

The specified person detection server 103 is composed of the pre-register 931, the specified person detector 932, the real-time registration unit 131 and the image searching unit 132. The specified person detection server is an apparatus such as a computer which includes: a control and operation part such as CPU (Central Processing Unit) or MPU (Micro-Processing Unit, Micro-computer); an internal memory such as RAM (Random Access Memory) or flash memory; and a storage medium such as HDD (Hard Disk Drive).

In FIG. 1, the monitor terminal 102 is a monitor terminal with an image searching function. The specified person detection server 103 is an updating type specified person detection server. Similarly to the specified person detection server 903 of the conventional mode, the specified person detection server 103 of the present invention is an apparatus such as a computer which includes: the control and operation part such as CPU or MPU; the internal memory such as RAM or flash memory; and the storage medium such as HDD.

The real-time registration unit 131 of the specified person detection server 103 performs an operation of picking up a given person or given persons from images inputted from the image pickup devices 901-1 to 901-n via the network 900 and registering the person(s) of interest either on a specified person list or an unspecified person list. This operation is performed on a real-time basis.

Similarly to the specified person list, the unspecified person list is a database, for example. The unspecified person list is stored in the storage medium (not shown) such as HDD. The same data as the data stored in the specified person list as well as, for example, degree of reliability of the data on each registered person as calculated from the degree of image similarity are registered on the unspecified person list. The degree of reliability may be determined by referring to the image similarities calculated in a specified person detection operation and adopting the image similarity of the highest value. The storage medium such as HDD may be directly connected to the specified person detection server 103 or connected thereto via the network 900.

The image searching unit 132 of the specified person detection server 103 performs an operation of principally searching for an image similar to an image of a given person on the unspecified person list. The image searching unit 132 searches the unspecified person list for the image of a person specified by a search key image. Hereinafter, the image of a person to be searched for or the image serving as a search key will be referred to as "search key image."

Specifically, the image searching unit 132 calculates the degree of image similarity by comparing the image feature quantity extracted from the search key image and the image feature quantity retrieved from the unspecified person list and extracts, from the unspecified person list, the image the calculated degree of image similarity of which is equal to or more than a predetermined threshold.

The search key image for the person of interest is an image inputted to the real-time registration unit 131, namely an image placed on the specified person list or the unspecified person list, an image specified by the additional registration operation unit 122 of the monitor terminal 102 to be described herein later, and the like. The search key image may not be an image itself but may also be an image feature quantity extracted from the image. In this example, the image and the image feature quantity placed on the specified person list are used as the search key image.

The image searching unit 132 does not only function to search for the similar images but also have processing capability of searching the unspecified person list for the data of interest or the image of the person of interest based on only the condition such as shooting time range, imaging camera and personal information.

The search request generating unit 121 of the monitor terminal 102 generates an image search request signal to be transmitted to the updating type specified person detection server for the purpose of searching the unspecified person list for the similar image of the person of interest. Specifically, the search request generating unit 121 generates the search request signal based on at least one of the search key image and the image feature quantity specified by the user manipulating the keyboard or mouse as the user input device of the monitor terminal 102 and the search condition specified via a screen portion 511 shown in FIG. 5, which will be described hereinlater.

The image searching unit of the specified person detection server extracts the image feature quantity from the search key image included in the search request signal and specified by the user. Alternatively, the image feature quantity itself may be specified as the search key image.

In response to user decision or automatically, the additional registration operation unit 122 of the monitor terminal 102 adds, to the specified person list, data added with information of a person identified from the unspecified person list. The processing of the additional registration operation unit 122 permits the operation of selecting data from the unspecified person list and adding the selected data to the specified person list to be accomplished efficiently and quickly through the image search.

The image search is performed by the search request generating unit 121 of the monitor terminal 102 with the image searching function and the image searching unit 132 of the updating type specified person detection server.

Specifically, out of the individual images acquired by the image search, an image that has reliability equal to or higher than the predetermined threshold and such a high similarity as to be obviously determined to be the image of the person of interest is automatically transferred from the unspecified person list to the specified person list. As to an image having reliability less than the threshold, the monitor terminal is configured to allow the user to determine whether or not to add the image in question to the specified person list.

Although not illustrated by the example of FIG. 1, the system structure of the example shown in FIG. 1 may further include a picture recorder.

For example, the picture recorder is connected to the network 900 so as to constantly store the images inputted from the image pickup devices 901-1 to 901-n via the network 900.

Further, the system of the example may also be arranged such that the databases including the specified person list, the unspecified person list and the like are stored in the picture recorder rather than in the storage medium such as HDD.

The monitor terminal 102 and the specified person detection server 103 are connected to the picture recorder via the network 900 so as to retrieve the image data from the picture recorder. The system of the example equipped with the picture recorder acquires the images and additional information (ID of image pickup device, shooting date, etc.) for the detection of specified person via the picture recorder instead of acquiring the images from the image pickup devices 901-1 to 901-n via the network 900. The other operations are the same as those of the example of FIG. 1 and hence, the description thereof is dispensed with.

Next, the following description is made on respective flows of operations of the devices and processing units that constitute the specified person detection system of the present invention.

Figure 2:
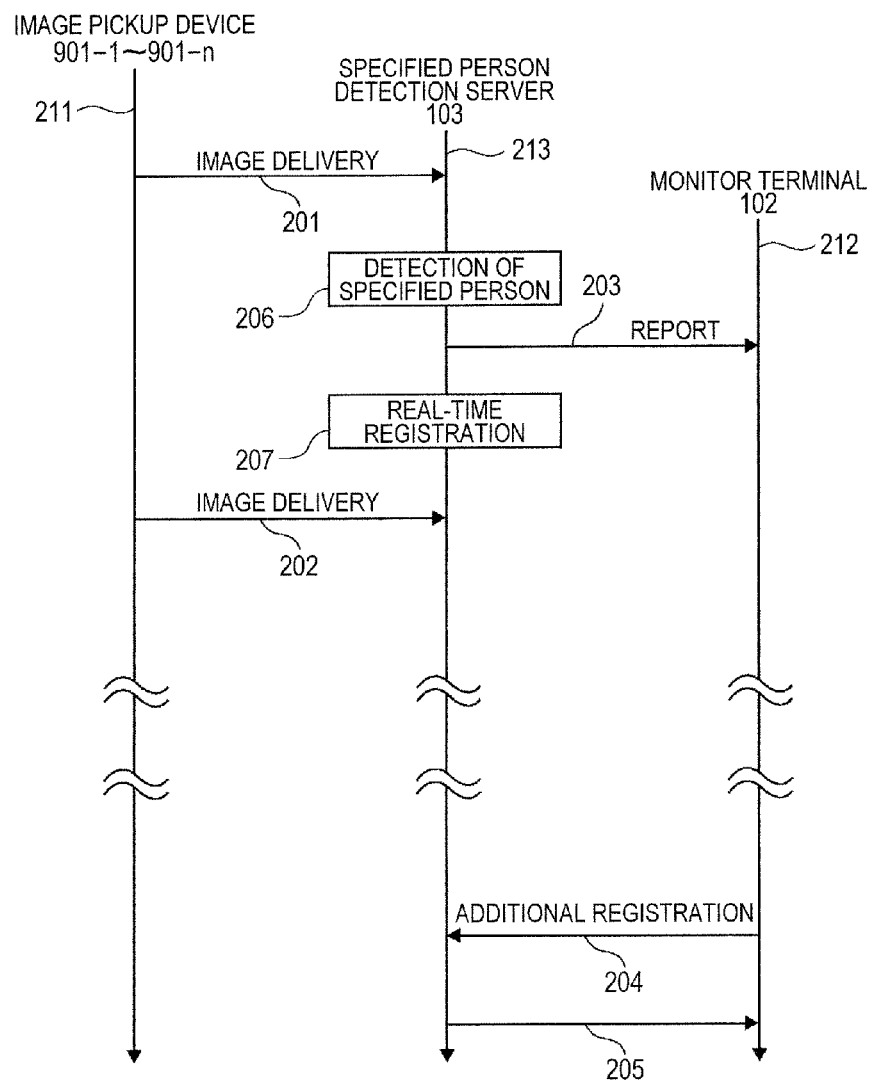
FIG. 2 is a diagram showing an exemplary communication sequence between devices of the specified person detection system according to one example of the present invention.

FIG. 2 is a diagram showing an exemplary communication sequence between the devices of the specified person detection system of the present invention shown in FIG. 1.

A time axis 211 is an axis representing the direction of time series in the image pickup devices 901-1 to 901-n, showing that time goes from the upper side to the lower side of FIG. 2. Similarly, a time axis 213 represents a time axis in the updating type specified person detection server 103 while a time axis 212 represents a time axis in the monitor terminal 102 with the image searching function. Communication is carried out in the direction of arrows.

A communication step 201 and a communication step 202 represent a communication operation (image delivery) for transmitting the image captured by the image pickup device 901-1 to the specified person detection server 103.

A communication step 203 represents a communication operation (report) for transmitting contents detected by the specified person detection server 103 to the monitor terminal 102.

A communication step 204 represents a communication operation (additional registration) of the monitor terminal 102 transmitting an instruction given by the user to the specified person detection server 103.

A communication step 205 represents a communication operation of the specified person detection server 103 transmitting the result of additional registration to the monitor terminal 102.

An event 206 represents the detection of the specified person by the specified person detection server 103. An event 207 represents the real-time registration made by the specified person detection server 303.

The communication steps 201, 202 are continuously repeated at given time intervals. The communication steps 201 to 203 and the communication steps 204 and 205 may be synchronized or otherwise be in non-synchronous relation.

Figure 3:
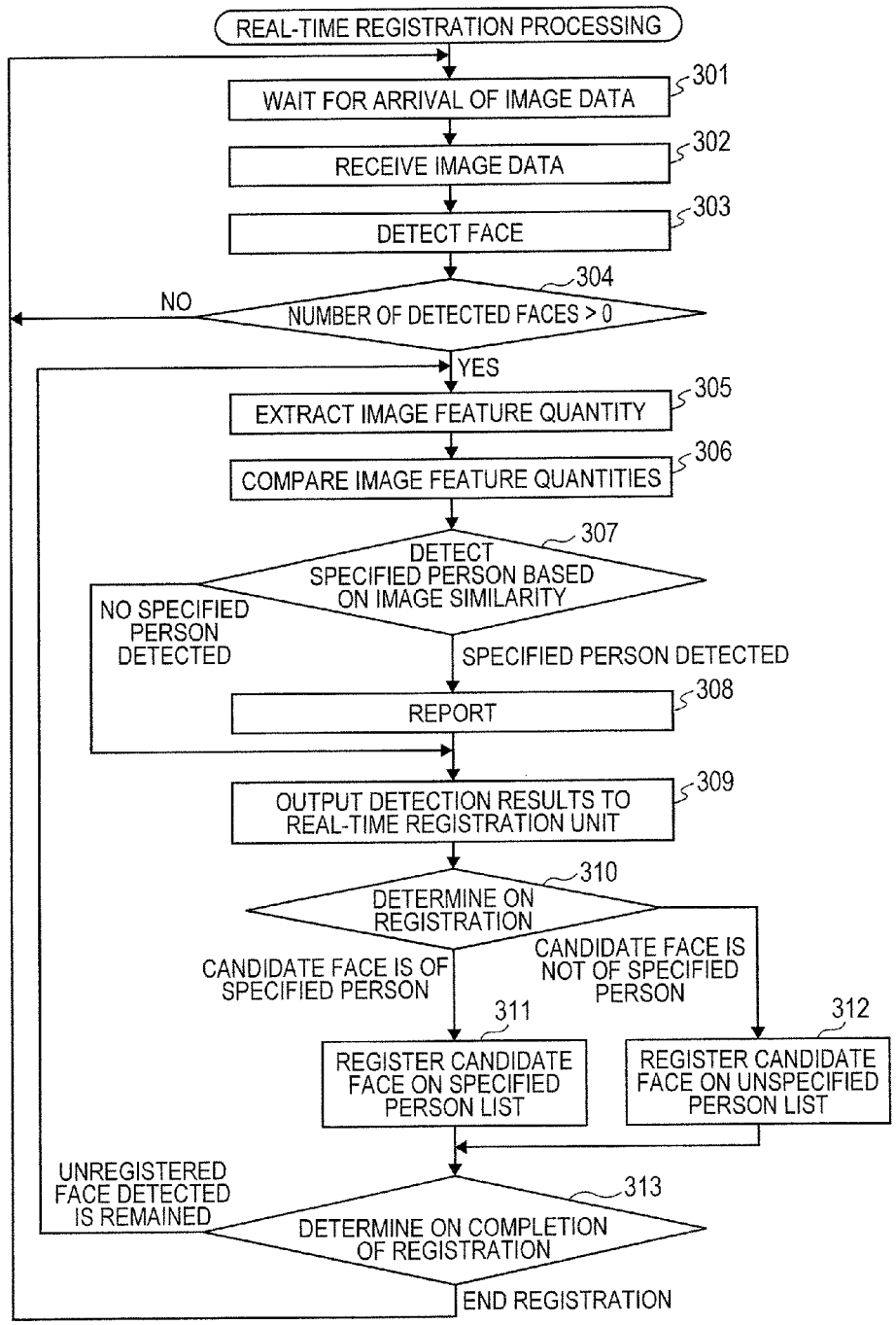
FIG. 3 is flow chart showing the steps of real-time registration processing of the specified person detection system according to one example of the present invention.

Referring to FIG. 3, description is made on an exemplary real-time registration processing performed by the specified person detection server 103 of an unspecified person detection system according to one example of the present invention. FIG. 3 is a flow chart showing the steps of an exemplary operation continuously repeated by the specified person detection server 103. Most of the operation shown in FIG. 3 is controlled and performed by the specified person detector 932. Therefore, the description of the operation controlled and the operation performed by the specified person detector 932 does not particularly refer to the specific name of the device.

Referring to FIG. 3, the detector waits for the arrival of image data in Step S301. Upon detecting the arrival of image data from any one of the image pickup devices 901-1 to 901-n, the detector proceeds to Step S302.

In Step S302, the detector receives the image from any one of the image pickup devices 901-1 to 901-n that is determined to have transmitted the image via the communication step 201 or 202. In a case where the image data is compressed, data decompression processing, which is not shown in FIG. 3, is performed.

In Step S303, the detector detects face(s) from the received image. Further, the detector temporarily stores the number of faces detected at the same time as the number of detected faces and then, initializes a face counter Ct. The face counter Ct is used for performing the subsequent steps on a per-person basis in a case where plural persons are detected from the same image.

The face detection processing is performed by the well-known image recognition technique which includes: a method wherein a moving object is detected based on a difference from a background image and face outline is determined based on the configuration or the like of an area of the moving object; a method wherein the image is searched for face by using face features such as layout of main face components including eyes, nose, mouth and the like, or density difference between the forehead and the eyes; and the like. According to the present invention, any of the above methods is usable.

In Step S304, the detector proceeds to Step S305 in a case where one or more faces (Ct>0) are detected by the previous step S303. Otherwise, the detector returns to Step S301.

In Step S305, the detector performs processing of extracting image feature quantity from the face detected by the previous step S303. The image feature quantity means a value indicating the tendency of the image as calculated using the image recognition technique. Examples of the usable image feature quantity include color distribution of image, composition distribution of edge pattern, layout of main face elements including eyes, nose, mouth and the like, and the combinations thereof. According to the present invention, any of the above parameters is usable.

In Step S306, the detector compares the image feature quantity extracted by the previous step S305 with an image feature quantity of each of the persons previously registered on the specified person list. Thus, the detector searches out a face (candidate face) having the nearest feature quantity from the faces registered on the specified person list. This nearness of the image feature quantity is generally referred to as "image similarity", which is a numerical value representing the nearness between images or so-called similarity between images. The image similarity is calculated on the basis of scalar quantity between two feature quantities in multidimensional space of the image feature quantity. The details of the calculation method may be referred to literatures such as "Visualization Models for Large Image Sets" (Atsushi Hiroike, et. al., P 93-P 101, No. 1, vol. 66, Journal of the Society of Photography and Imaging of Japan 2003).

In Step S307, the detector determines whether or not the image similarity of the candidate face searched out in Step S306 is high enough to identify the specified person (detect the specified person). The determination is made based on whether or not the degree of image similarity calculated in Step S306 is equal to or more than a predetermined threshold. The image similarity calculated in Step S306 is also used to calculate the reliability of the detection of specified person. If the degree of reliability is equal to or more than the threshold, the detector verifies the detection of specified person and proceeds to Step S308. Otherwise, the detector does not verify the detection of specified person and skips to Step S309.

In Step S308, the detector transmits a report of the detection of the specified person to the monitor terminal 102 via a communication step 403. After the report is transmitted, the detector proceeds to Step S309.

In Step S309, the detector outputs, to the real-time registration unit 131, the image feature quantity extracted in Step S305 and information on the candidate face searched out in Step S306 and the reliability thereof.

In Step S310, the detector outputs the detection results to the real-time registration unit 131. The real-time registration unit 131 evaluates the reliability of the inputted candidate face, determining whether the reliability is less than a predetermined threshold or not. If the reliability is less than the threshold, the registration unit proceeds to Step S311 to register the candidate face on the specified person list. Otherwise, the registration unit proceeds to Step S312 to register the candidate face on the unspecified person list.

In Step S311, the real-time registration unit 131 additionally registers the image feature quantity on the specified person list. At the same time, the real-time registration unit 131 also registers, on the specified person list, information on the candidate face, namely the name, professional affiliation and the like of the person of interest. After the completion of registration, the real-time registration unit 131 increments the face counter Ct and then, proceeds to Step S313.

In Step S312, the real-time registration unit 131 additionally registers the image feature quantity on the unspecified person list. At the same time, the real-time registration unit 131 also registers, on the unspecified person list, information on the candidate face, namely the name, professional affiliation and the like of the person of interest as well as the reliability of the candidate face. After the completion of registration, the real-time registration unit 131 increments the face counter Ct and then, proceeds to Step S313.

In Step S313, the specified person detector 932 compares the face counter Ct with the number of detected faces temporarily stored in Step S303. If the value of the face counter Ct is less than the number of detected faces, the detector returns to Step S305. Otherwise, namely when all the faces detected from the single image are processed, the operation returns to Step S301.

Figure 4:
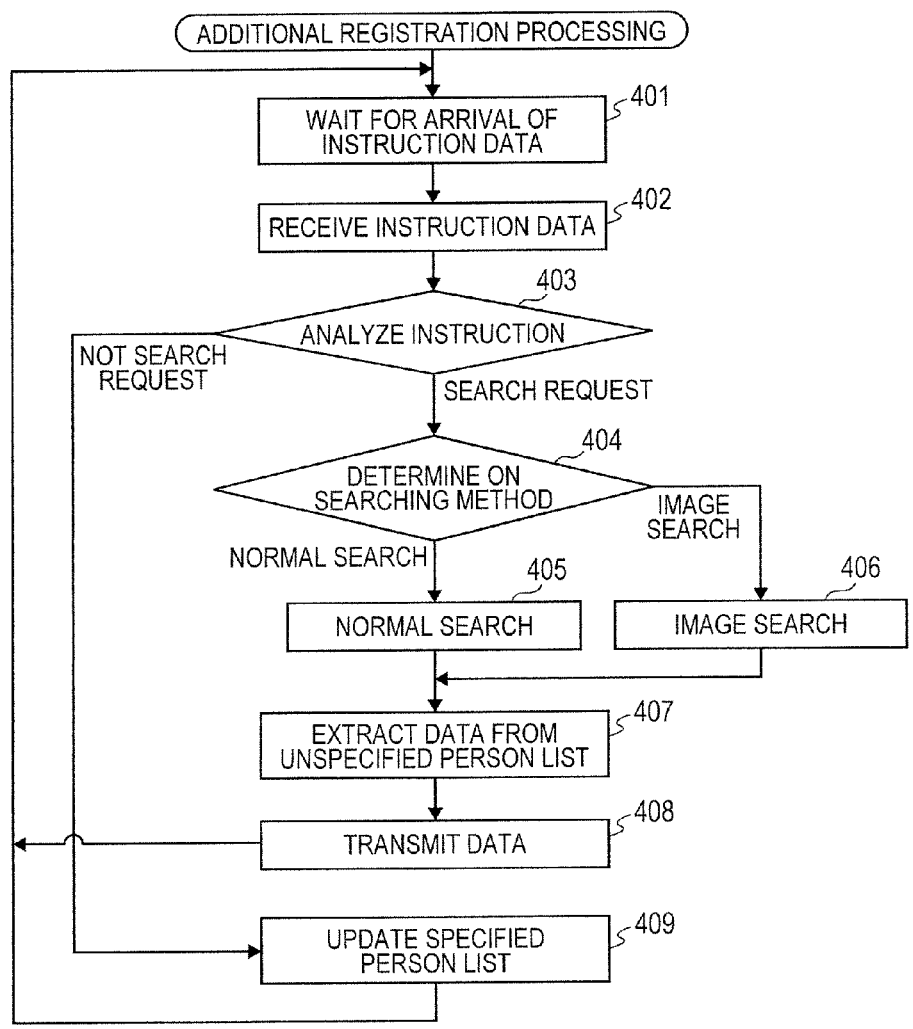
FIG. 4 is a flow chart showing the steps of processing performed when an instruction to make additional registration is issued by an unspecified person detection system according to one example of the present invention.

Now referring to FIG. 4, description is made on exemplary processing performed by the specified person detection server when the monitor terminal in the unspecified person detection system according to the example of the present invention instructs the specified person detection server to make an additional registration. FIG. 4 is a flow chart showing the steps of processing performed by a specified person detection server 103 when the instruction to make the additional registration is given to the specified person detection server 103 of the unspecified person detection system of the present invention. Most of the processing shown in FIG. 4 is controlled and performed by the image searching unit 132. Therefore, the description on the processing performed by the image searching unit 132 does not particularly refer to the specific name of the processor.

In Step S401 of FIG. 4, the searching unit waits for the arrival of instruction data. Detecting the arrived instruction data, the searching unit proceeds to Step S402.

In Step S402, the searching unit receives the instruction sent from a monitor terminal 102 via the communication step 204 (see FIG. 2).

In Step S403, the searching unit analyzes the instruction received in Step S402. If the instruction is a search request, the searching unit proceeds to Step S404. If the instruction is an identification request, the searching unit proceeds to Step S409.

In Step S404, the searching unit determines on a searching method for the instruction received in Step S402. If the searching method is to meet a request for normal search performed based on a condition such as shooting time range, shooting time or information on a person of candidate face, for example, the searching unit proceeds to Step S405. If the searching method is to meet a request for image search performed based on a condition such as image or image feature quantity, the searching unit proceeds to Step S406.

In Step S405, in accordance with the condition of the normal search request received in Step S402, the searching unit searches the unspecified person list for a data piece to be left to a user's determination as to whether to be additionally registered or not. This search is an operation to search out an image by sequentially checking each of the data pieces on the unspecified person list if it matches the condition.

In Step S406, in accordance with the condition of the image search request received in Step S402, the searching unit searches the unspecified person list for a data piece left to determination as to whether to be additionally registered or not. This search is an operation of calculating the image similarity by comparing the image feature quantity extracted from the image meeting the condition and the image feature quantity of each of the data pieces on the unspecified person list, and searching out the image having the high similarity based on the calculated image similarity.

In Step S407, the searching unit extracts the target data piece from the unspecified person list, the data piece selected in Step S405 or Step S406. Subsequently, the searching unit proceeds to Step S408.

In Step S408, the searching unit transmits the data extracted in Step S407 to the monitor terminal 102 via the communication step 205. Subsequently, the searching unit returns to Step S401.

In Step S409, the searching unit adds to the specified person list the personal information, the image feature quantity, the shooting time and the like for the image that is included in the identification request and placed on the unspecified person list. Subsequently, the searching unit returns to Step S401.

Figure 5:
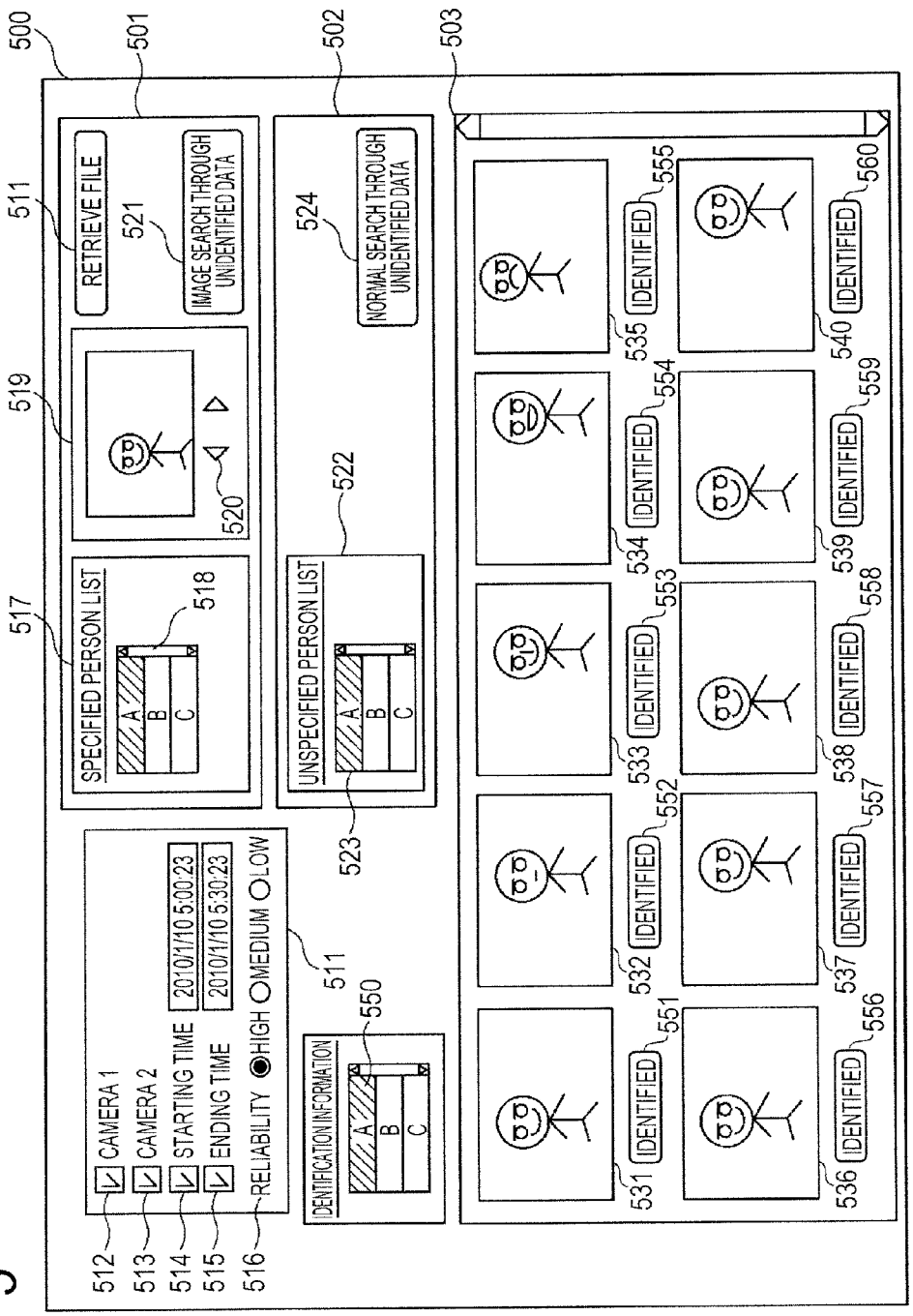
FIG. 5 is a diagram showing an exemplary on-screen display of a display monitor of a monitor terminal when the specified person detection system according to the present invention instructs a specified person detection server to make additional registration.

An operation of giving the instruction to make the additional registration to the specified person detection system according to the example of the present invention is described by way of a user interface shown in FIG. 5. FIG. 5 is a diagram showing an exemplary on-screen display of a display monitor of the monitor terminal 102 when the user manipulates a GUI or the like to issue the instruction to make additional registration to the specified person detection server 103 of the specified person detection system of the present invention.

A reference numeral 500 represents an additional registration screen displayed on the display monitor of the monitor terminal 102. Individual screen portions to be described hereinlater are shown in this additional registration screen 500. It is noted that a screen portion 503 to display searched images appears after a search condition (a screen portion 511) is entered and a screen portion 521 for image search through unidentified data in a screen portion 501 is selectively manipulated or a screen portion 524 for normal search through unidentified data in a screen portion 502 is selectively manipulated. The screen portion 503 is updated each time these manipulations are performed.

A reference numeral 511 represents a screen portion through which a search condition for the unspecified person list is specified. Reference numerals 512, 513 each represent a screen portion through which a search condition for the unspecified person list or more particularly, an imaging camera is specified.

Reference numerals 514, 515 each represent a screen portion through which a search condition for the unspecified person list or more particularly, a shooting time is specified. An input column for specifying a starting time of the shooting time search is in the row of the screen portion 514 and on the right side thereof. The starting time of the time search can be changed by changing year, month, day and clock time displayed in this column. Similarly, an input column for specifying an ending time of the shooting time search is in the row of screen portion 515 and on the right side thereof. The ending time of the time search can be changed by changing yare, month, day and clock time displayed in this column.

Checkboxes for selecting the corresponding screen portions are on the left side of the screen portions 512 to 515.

A reference numeral 516 represents a screen portion through which a search condition for the unspecified person list and the degree of reliability is specified.

Checkboxes for selecting the corresponding screen portion are disposed on the left side of the screen portion 516. It is assumed, for example, that "high" reliability is set to 80%, "medium" reliability is set to 50% and "low" reliability is set to 30%. In a case where "high" is checked, all the images having the reliability of 80% or more are searched. In a case where "medium" is checked, all the images having the reliability of 50% or more and less than 80% are searched. In a case where "low" is checked, all the images having the reliability of 30% or more and less than 50% are searched. In a case where "high" and "medium" are checked, all the images having the reliability of 50% or more are searched. In a case where "medium" and "low" are checked, all the images having the reliability of 30% or more and less than 80% are searched. In a case where "high", "medium" and "low" are all checked, all the images having the reliability of 30% or more are searched.

It is assumed that radio buttons are disposed on the left side of the screen portion 516 in place of the checkboxes and that the "high" reliability is set to 80%, the "medium" reliability is set to 50% and the "low" reliability is set to 30%. In a case where "high" is checked, all the images having the reliability of 80% or more are searched. In a case where "medium" is checked, all the images having the reliability of 50% or more are searched. In a case where "low" is checked, all the images having the reliability of 30% or more are searched.

In the screen portion 501, a reference numeral 517 represents a screen portion where the specified person list is classified and displayed according to the personal information. A reference numeral 518 represents a screen portion permitting the user to select any classified person. The screen portion 518 is equipped with a slider in case that the screen portion 518 cannot display all the persons at a time.

A reference numeral 519 represents a screen portion which displays one image of a person placed on the specified person list and selected through the screen portion 518. A reference numeral 520 represents a screen portion to change the image of the person selected through the screen portion 519 to another image. The image is changed by selectively pressing either one of the right and left buttons.

A reference numeral 521 represents a button-shaped screen portion to implement the image search through the unspecified person list.

A reference numeral 571 represents a screen portion for selecting a medium from which a reference image is retrieved. This screen portion permits the reference image to be selectively retrieved from, for example, the storage medium such as HDD or an external storage medium or removal storage medium via USB connection.

As described above with reference to FIG. 5, the unidentified data searched out by the image search can be added to the specified person list by the steps of deciding the search condition by means of the screen portion 511, making the search using the screen portion 501 dedicated to the image search, and permitting the user to identify the image displayed on the screen portion 519 as the specified person.

In the screen portion 502, a reference numeral 522 represents a screen portion where the unspecified person list is classified and displayed according to the personal information. A reference numeral 523 represents a screen portion permitting the user to select any classified person. The screen portion 523 is equipped with a slider if the screen portion 523 cannot display all the persons at a time.

The reference numeral 524 represents a button-shaped screen portion to implement the normal search through the unspecified person list.

A reference numeral 550 represents a screen portion through which image data of a specific person on the specified person list is selected as identification information in order to identify images 531 to 540 as the specific person.

It is noted that the screen portion 550 is equipped with a slider if the screen portion 550 cannot display all the persons at a time.

In FIG. 5, the user decides the search condition through the screen portion 511 and performs the search using the screen portion 502 for the normal search. The screen portion 503 is caused to appear by this user operation. Or if the screen portion 503 is already on the screen in FIG. 5, the screen portion 503 is updated by this user operation. The screen portion 503 is equipped with a slider if the screen portion 503 cannot display all the images at a time.

Next, the user recognizes any one of the images on the screen portions 531 to 540 in the screen portion 503 and identifies the image as the specific person by selecting a corresponding one of identification buttons 551 to 560 related with the respective images (disposed under the images in this example). Thus is accomplished the additional registration of the unidentified data, acquired by the image search, on the specified person list.

The user can additionally register any one of the images on the corresponding screen portions 531 to 540 as the image data of the specific person on the specified person list by selecting the required person through the screen portion 550, and by selecting any one of the screen portions 551 to 560 via the corresponding identification button. In a case where one image on one screen portion 531 includes a plurality of persons (not shown), for example, the user can easily add any one of the persons to the specified person list by changing the person shown on the screen portion 550 by specifying the specific person by means of a mouse or the like.

Figure 6:
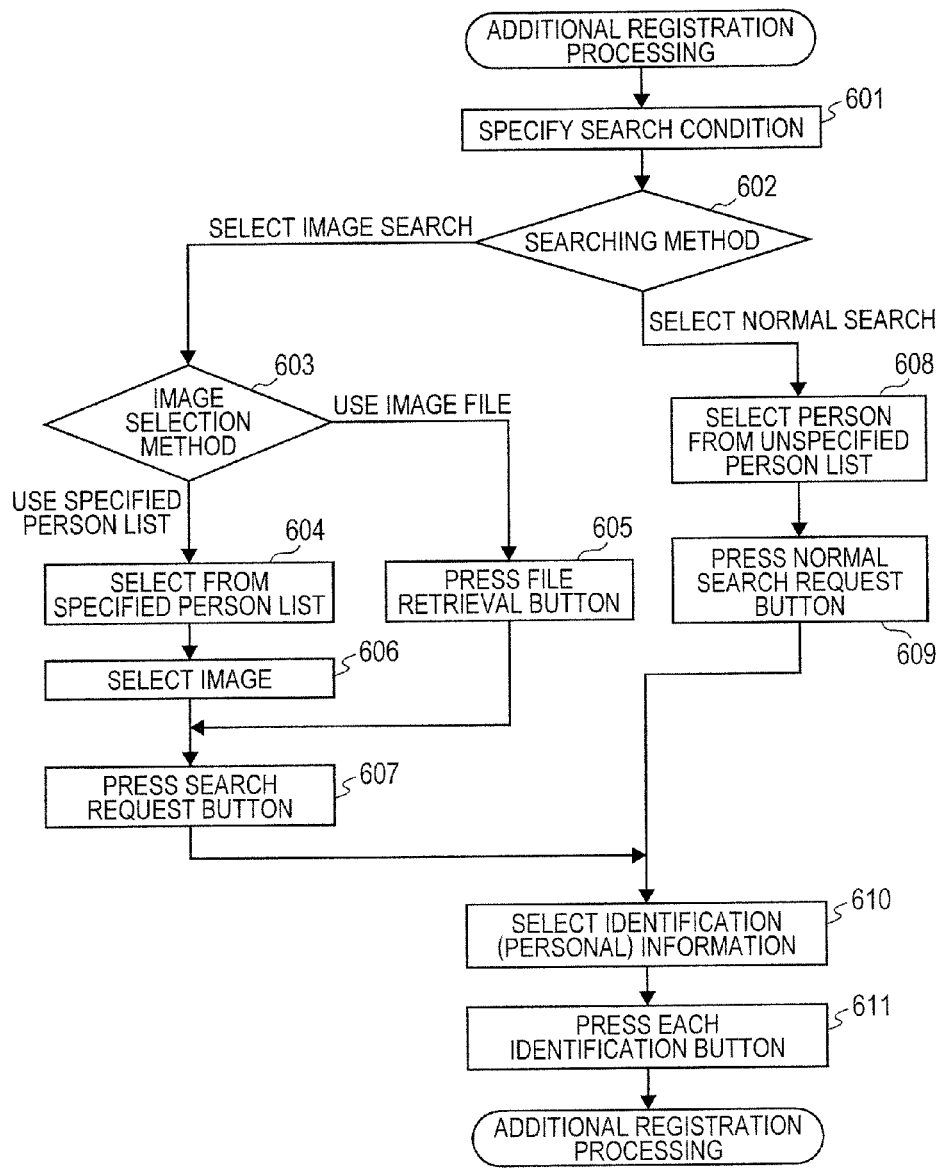
FIG. 6 is a flow chart showing the steps of an exemplary identification operation procedure taken by the specified person detection system according to the present invention.

Now referring to FIG. 6, description is made on a specific operation procedure taken by the monitor terminal 102 in the specified person detection system of the present invention when the monitor terminal 102 instructs the specified person detection server 103 to make the additional registration (see FIG. 1 to FIG. 5). FIG. 6 is a flow chart showing the steps of an exemplary identification operation procedure taken by the specified person detection system of the present invention. The chart illustrates how the user operates the interface of the monitor terminal 102 with the image searching function when the monitor terminal 102 with the image searching function instructs the updating type specified person detection server 103 to make the additional registration. The flow chart of FIG. 6 shows the operations implemented by the user manipulating principally the screen portions in the additional registration screen 500, image GUI or the like. Namely, the following operation steps are actions (manipulations) by the user.

In Step S601, the user manipulates the screen portion 511 to specify a condition of searching the unspecified person list for data to identify. If the user selects the checkbox of the screen portion 512, for example, a searched object in the searching step is data of a camera 1. Conversely if the checkbox of the screen portion 512 is not selected, the data of the camera 1 is excluded from the search. Subsequently, the user proceeds to Step S602.

In Step S602, the user selects a searching method. If the user wants the image search, the user proceeds to Step S603. If the user wants the normal search, the user proceeds to Step S608.

In Step S603, the user selects a method of acquiring the search key image used in the image search. In a case where an image of an already identified person is used, namely the search key image is selected from the specified person list, the user proceeds to Step S604. Alternatively in a case where an image possessed by the user is used, namely, the search key image is selected from the images stored in an externally connectable storage medium such as USB memory, the user proceeds to Step S605.

In Step S604, the user manipulates the screen portion 517 to select a person from the specified person list of persons who have been identified. Subsequently, the user proceeds to Step S606.

In Step S606, the user selects an image of the person specified in Step S604 using the specified person list. In a case where there are more than one images of the person specified in Step S604, the user manipulates the screen portion 520 to select one of the images. Subsequently, the user proceeds to Step S607.

In Step S607, the user presses the image search button equivalent to the screen portion 521. The monitor terminal 102 detects the pressed button so as to generate the image search request, and transmits the image search request to the specified person detection server 103. At this time, the image searching unit 132 of the specified person detection server 103 performs the image search and returns the search result to the monitor terminal 102. As a result, the images of the screen portions 531 to 540 of FIG. 5 are displayed. Subsequently, the user proceeds to Step S610.

In Step S610, the user manipulates the screen portion 550 to select personal information to be added. According to FIG. 5, the person 'A' is selected and hence, 'A' as the personal information is added to each image in the identification operation to be described hereinlater. Subsequently, the user proceeds to Step S611.

In Step S611, the user identifies the image of the person selected in Step S610 at the user's discretion. If the user identifies the image as the person selected in Step S610, the user presses each of the button-shaped screen portions 551 to 560 corresponding to the images. The monitor terminal 102 detects the pressed button so as to generate the identification request for each image and transmits the identification request to the specified person detection server 103.

In Step S605, the user selects an image that the monitor terminal 102 can refer to. For example, the user selects an image from the external storage medium or the removal storage medium USB-connected to the monitor terminal 102. Subsequently, the user proceeds to Step S607.

In Step S608, the user manipulates the screen portion 523 to select a person to identify from the unspecified person list. According to FIG. 5, the person 'A' is selected. In the normal search to be described hereinlater, data of the person 'A' is extracted from the unspecified person list under the condition specified via the screen portion 511. Subsequently, the user proceeds to Step S609.

In Step S609, the user presses the screen portion 524 as the normal search button. The monitor terminal 102 detects the pressed button so as to generate the normal search request and transmits the normal search request to the specified person detection server 103. At this time, the image searching unit 132 of the specified person detection server 103 performs the search and returns the search result to the monitor terminal 102. Examples of the search result are shown by the screen portions 531 to 540. Subsequently, the user proceeds to Step S610.

Next, one example of the specified person list and the unspecified person list of the specified person detection system according to the present invention are shown in FIG. 7A and FIG. 7B. FIG. 7A is a diagram showing the exemplary specified person list of the specified person detection server in the specified person detection system according to the present invention. FIG. 7B is a diagram showing the exemplary unspecified person list of the specified person detection server in the specified person detection system according to the present invention.

Items 711, 721 each represent a registration ID and a characteristic value is assigned to each data piece of each list. Items 712, 713, 722, 723 each represent an information piece indicating time when the image is captured or a camera that captured the image. Items 714, 724 each represent an address of the storage medium such as HDD or location where the image feature quantity extracted from the image is stored. Items 716, 726 each represent an address of the storage medium such as HDD or location where the image is stored.

In the specified person list of FIG. 7A, an item 715 of the specified person list represents personal information assigned to each image and exemplified by name or ID number of a person.

In the unspecified person list of FIG. 7B, an item 725 represents personal information assigned by specified person detection processing and exemplified by name or ID number of a person that the system automatically assigned on a provisional basis. An item 726 represents the reliability of the personal information assigned to the item 725.

As the personal information in the item 725 of FIG. 7B, a person not placed on the specified person list is displayed as "person W" meaning a "gray" person.

The lists of FIG. 7A and FIG. 7B can also be outputted as a display screen image on the display monitor of the monitor terminal 102. In this case, the column of the "gray" person can be deco-displayed in color highlighting or the like. Similarly, the value of reliability may also be color-coded according to set values for reliability "high", reliability "medium" and reliability "low".

Figure 8:
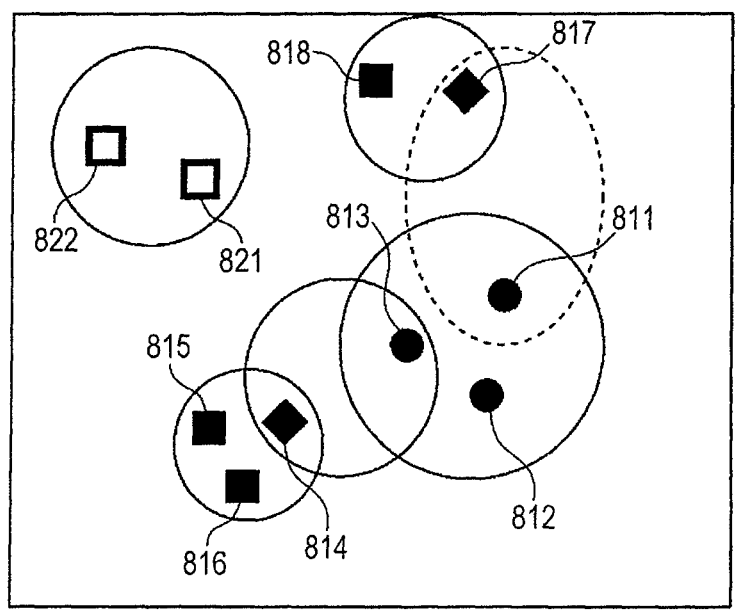
FIG. 8 is a diagram conceptually illustrating metric spaces of image feature quantities in the specified person detection system according to an embodiment of the present invention.
Figure 9:
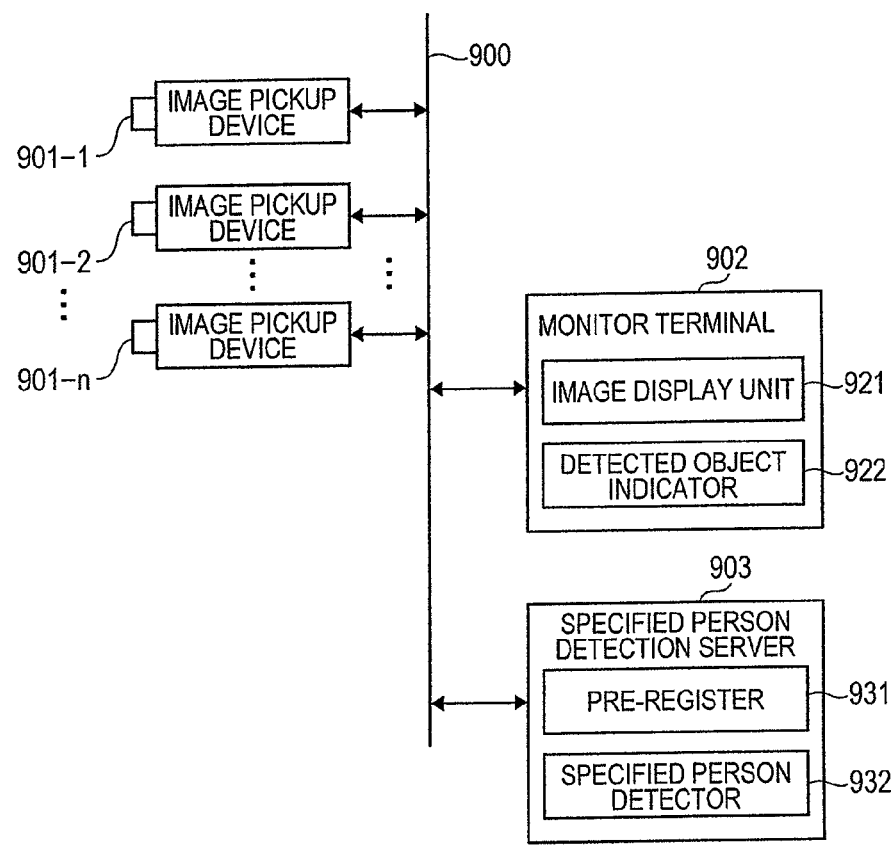
FIG. 9 is a block diagram showing a structure of a specified person detection system according to a conventional mode.

The operation of the above-described specified person detection system X is described with reference to FIG. 8 showing a relation between the image feature quantities of the information registered on the specified person list or the unspecified person list. FIG. 8 conceptually illustrates the relation between the image feature quantities in the detection of the specified person or the image search performed in the metric spaces of the image feature quantities.

It is assumed here that image feature quantities 811 to 813 extracted from the face images of the same person are registered on the specified person list to be used for detecting the specified person. It is further assumed, for example, that image feature quantities 814, 817 are acquired from face images of person(s) imaged anew by the image pickup device. In this case, if a distance (difference) between the image feature quantities 813 and 814 is shorter than a predetermined distance threshold (less than the threshold), the image of the image feature quantity 814 is identified as the specified person and can be registered anew on the specified person list. Furthermore, the image feature quantity 817 of a similar image acquired by the image search can be additionally registered anew on the specified person list at the user's discretion.

Subsequently, in a case where images having other image feature quantities 815 and 816 close to the image feature quantity 814 are selected as a search object image for detection of the specified person, images of the image feature quantities 815 and 816 as well as 818 can be identified as the specified person.

In the specified person detection system of the conventional mode, the difference of the image feature quantities listed on the specified person list increases depending upon the conditions including shooting angle, image resolution, luminous surroundings and the like, so that the images that should actually be identified as the same person are determined to belong to different persons. During the system operation, however, the specified person detection system of the present invention can automatically determine the images on a real-time basis according to the distance between the image feature quantities. Further, the system of the present invention can collectively register the image feature quantities on the specified person list or the unspecified person list at the user's discretion. As a result, the system can achieve a dramatically increased accuracy in the identification and detection of persons.

Because of the increased accuracy in the identification and detection of persons, the restrictions on the conditions including shooting angle, image resolution, luminous surroundings and the like are dramatically loosened. This permits the use of the specified person detection system at such places where the door or gate cannot be installed. Hence, the specified person detection system can find a wider range of application.

It is to be noted that the structure and operations of the above-described embodiments are mere illustrative examples. As a matter of course, the present invention can be embodied in other specific forms without departing from the spirit and scope of the present invention.

For the sake of simplicity, the example shown in FIG. 1 is described on assumption that the system consists of one each of all the components. However, a plurality of each of the components can be connected to the network.

Although the above-described example has the structure where the updating type specified person detection server 103 integrates the pre-register 931, the specified person detector 932, the real-time registration unit 131 and the image searching unit 132, some of the processing units may be disposed in other devices.

Although the above-described example has the structure where the monitor terminal 102 with the image searching function integrates the image display unit 921, the detected object indicator 922, the search operation unit 121 and the additional registration operation unit 122, some of the processing units may be disposed in other devices.

Although the above-described example has the specified person list and the unspecified person list as separate components, these person lists may be unified to be placed under uniform management.

REFERENCE SIGNS LIST

102: MONITOR TERMINAL
103: SPECIFIED PERSON DETECTION SERVER
121: SEARCH REQUEST GENERATING UNIT
122: ADDITIONAL REGISTRATION OPERATION UNIT
131: REAL-TIME REGISTRATION UNIT
132: IMAGE SEARCHING UNIT
500: ADDITIONAL REGISTRATION SCREEN
502,503,511 to 524, 531 to 540, 550 to 560: SCREEN PORTION
900: NETWORK 901-1 to 901-n: IMAGE PICKUP DEVICE
902: MONITOR TERMINAL
903: SPECIFIED PERSON DETECTION SERVER
921: IMAGE DISPLAY UNIT
922: DETECTED OBJECT INDICATOR
931: PRE-REGISTER
932: SPECIFIED PERSON DETECTOR

The invention claimed is:

1. A person detection system comprising:
an image pickup device for capturing images;
a specified person detection server;
a database storing personal information; and
a plurality of monitor terminals,
wherein the database includes a specified person list and an unspecified person list,
wherein the specified person detection server updates the database by iteratively acquiring an image captured by the image pickup device, calculating a degree of reliability for identifying a person in the acquired image by using image feature quantities extracted from the acquired image, and storing image data of the acquired image on the unspecified person list based on the calculated degree of reliability,
wherein the specified person detection server additionally registers, on the specified person list, the image captured by the image pickup device or the personal information of a person retrieved from the unspecified person list in response to a request from one of the monitor terminals,
wherein the one of the monitor terminals comprises at least one of an image display unit, a detected object indicator, a search request generating unit,
wherein another one of the monitor terminals comprises an additional registration operation unit, and
wherein the image is additionally registered during the system operation based on a difference of the face image of the person caused by the shooting angle and variations of the face image caused by luminous source position, makeup, age-related change in face, or accessories.

2. The person detection system according to claim 1, wherein the one of the monitor terminals displays, on a display monitor, an additional registration screen, and
wherein the additional registration screen displayed on the display monitor includes a screen portion for search condition and a screen portion for search through the unspecified person list, displays, on the additional registration screen, a face candidate to be additionally registered on the specified person list based on conditions inputted by a user to the screen portion for search condition and to the screen portion for search through the unspecified person list, and additionally registers the face candidate in response to a user's instruction.

3. The person detection system according to claim 2, wherein an updating type specified person detection server storing the image feature quantities of the unspecified person list, provisional personal information and the reliability on a real time basis and the one of the monitor terminals with an image searching function capable of searching an image afterward are interconnected via a network.

4. The person detection system according to claim 3, wherein the updating type specified person detection server adds the personal information to the specified person list during the system operation based on the updated unspecified person list.

5. The person detection system according to claim 1, wherein the specified person detection server comprises:
a real-time registration unit for updating the database on a real-time basis, by iteratively acquiring an image captured by the image pickup device at given time intervals, searching the specified person list for similar image by using image feature quantities extracted from the acquired image, calculating a degree of reliability for identifying a person in the acquired image, reporting to the monitor terminal if the calculated degree of reliability is greater than or equal to a threshold, registering the image data of the acquired image with personal information corresponding to the acquired image on the specified person list if the degree of reliability meets a predetermined condition, and registering the image data of the acquired image with provisional personal information and the degree of reliability on the unspecified person list if the degree of reliability does not meet the predetermined condition.

6. The person detection system according to claim 5, wherein the unspecified person list contains therein not only the same data as data stored on the specified person list but also the reliability for each of the registered persons as calculated from the image similarity, and wherein the reliability adopts the image similarity of highest value by referring to the image similarities calculated in specified person detection processing.

7. The person detection system according to claim 1, wherein the reliability is determined for each of the images acquired by image search and an image having reliability equal to or more than a predetermined threshold and a similarity high enough to identify the image of the person of interest is automatically added from the unspecified person list to the specified person list.

8. The person detection system according to claim 7, wherein an image of a person to be searched out or an image serving as a search key is referred to as "search key image", and wherein an image searching unit of the specified person detection server calculates an image similarity by comparing the image feature quantities extracted from the search key image with the image feature quantities listed on the unspecified person list, and extracts an image from the person list that has the calculated image similarity equal to or more than a predetermined threshold.

9. The person detection system according to claim 7, wherein the one of the monitor terminals and the specified person detection server are connected to a picture recorder via a network and are capable of retrieving the image data from the picture recorder, and wherein the images inputted from the image pickup device via the network are constantly stored in the picture recorder while the database including the specified person list and the unspecified person list is stored in the picture recorder.

10. The person detection system according to claim 7, wherein the specified person list and the unspecified person list have a common substructure and are placed under uniform management.

11. The person detection system according to claim 1, wherein in a case where the image feature quantities extracted from the face image of the specified person is registered on the specified person list for use in the detection of specified person and an additional image feature quantities is acquired from a face image of a person captured anew by the image pickup device, the image having the new image feature quantities is identified as the specified person and additionally registered on the specified person list if a difference from the registered image feature quantities is less than a predetermined threshold, or in a case where image feature quantities of a similar image acquired by image search is additionally registered on the specified person list at user's discretion and thereafter, another image having image feature quantities close in distance to the additionally registered image feature quantities is subjected to the detection of specified person, the image feature quantities of the another image close in distance to the additionally registered image feature quantities is identified as the person.

12. The person detection system according to claim 1, further comprising:
   a specified person detection sub-server,
   wherein the specified person detection server comprises at least one of a pre-register, a specified person detector, a real-time registration unit, and an image searching unit,
   wherein the specified person detection sub-server comprises at least one of the pre-register, the specified person detector, the real-time registration unit, and the image searching unit not comprised by the specified person detection server, and
   wherein the specified person detection server and the specified person detection sub-server are separated and connected to a network.

13. A person detection system comprising:
   an image pickup device for capturing images;
   a specified person detection server;
   a database storing personal information;
   a monitor terminal, wherein the specified person detection server repeats real-time registration processing;
   means which waits for arrival of image data and detects the arrival of the image data from the image pickup device;
   means which receives, from the image pickup device, the image data the arrival of which was detected, and detects a face from the received image data;
   means which differentiates between a case where the face was detected and a case where the face was not detected;
   means which, in response to the face detection, performs processing of extracting an image feature quantity from the detected face;
   means which compares the extracted image feature quantity with an image feature quantity of each person previously registered on a specified person list;
   specified person detection means which searches out, from the specified person list, a candidate face having an image feature quantity closest to the extracted image feature quantity and determines whether or not an image similarity of the detected candidate face is high enough to identify the specified person;
   report means which calculates a degree of reliability of the detection of the specified person by using the image similarity, verifies the detection of the specified person if the degree of reliability is equal to or more than a threshold, and transmits a report of the detection of the specified person to the monitor terminal;
   means which, in a case where the degree of reliability is less than the predetermined threshold, determines that the specified person was not detected and inputs, to a real-time registration unit, the extracted image feature quantity and the personal information and reliability of the candidate face and which evaluates the reliability of the inputted candidate face by determining whether the reliability of the candidate face is less than the predetermined threshold or not,
      wherein the real-time registration unit which includes:
         means which additionally registers the extracted image feature quantity on the specified person list if the reliability of the candidate face is greater than the predetermined threshold; and
   means which additionally registers the extracted image feature quantity on an unspecified person list if the reliability of the candidate face is less than the predetermined threshold,
      wherein after completion of the registration on the specified person list, the specified person detection server compares a number of detected faces temporarily stored by the means which detects a face with a number of faces from which the image feature quantities were extracted, and
      wherein the operation returns to the means which performs processing of extracting the image feature quantity if the number of faces from which the image feature quantities were extracted is less than the number of detected faces, and wherein the operation returns to the means which waits for the arrival of image data if the number of faces from which the image feature quantities were extracted is equal to the number of detected faces.

14. The person detection system according to claim 13, wherein the image feature quantity values indicating the tendency of the image as calculated using an image recognition technique and wherein the calculation of the image feature quantity uses at least one of color distribution of image, composition distribution of edge pattern layout of main face elements including eyes, nose and mouth.

15. The person detection system according to claim 13, wherein the means for additionally registering the extracted image feature quantity on the specified person list also additionally registers at least one of information of the candidate face, the personal information including the name and professional affiliation, and
   wherein the means for additionally registering the extracted image feature quantity on the unspecified person list also additionally registers, on the unspecified person list, at least one of the information of the candidate face, the personal information including the name, professional affiliation and the reliability of the candidate face.

16. A person detection system comprising:
   an image pickup device for capturing images;
   a specified person detection server;
   a database storing personal information; and
   a plurality of monitor terminals,
      wherein the database includes a specified person list and an unspecified person list,
      wherein the specified person detection server updates the database by iteratively acquiring an image captured by the image pickup device, calculating a degree of reliability for identifying a person in the acquired image by using image feature quantities extracted from the acquired image, and storing image data of the acquired image on the unspecified person list based on the calculated degree of reliability,
      wherein the specified person detection server additionally registers, on the specified person list, the image captured by the image pickup device or the personal information of a person retrieved from the unspecified person list in response to a request from one of the monitor terminals,
      wherein the one of the monitor terminals comprises at least one of an image display unit, a detected object indicator, a search request generating unit, wherein another one of the monitor terminals comprises an additional registration operation unit, wherein the reliability is determined for each of the images acquired by image search and an image having reliability equal to or more than a predetermined threshold and a similarity high enough to identify the image of the person of interest is automatically added from the unspecified person list to the specified person list, and wherein the one of the monitor terminals outputs to a display monitor an additional registration screen which includes a search condition screen portion for specifying the image pickup device, a search execution screen portion for searching the unspecified person list by specifying provisional personal information, a result display screen portion for displaying searched images, an identification information screen portion for specifying which person on the specified person list an additional registered person is, displays candidate face additionally registered on the specified person list on the result display screen portion based on the search condition and input to the search condition screen portion by the user, and additionally registers the candidate face specified on the result display screen portion by the user on the specified person list as a person specified on the identification information screen portion.

17. A method for a person detection system, the person detection system including an image pickup device for capturing images, a specified person detection server, a database storing personal information, and a monitor terminal, wherein when a monitor terminal of an unspecified person detection system instructs the specified person detection server to make an additional registration, the method comprises steps of:

waiting for arrival of instruction data, and detecting the arrival of the instruction data;

receiving an instruction from the monitor terminal via communications;

analyzing the content of the received instruction, and determining whether the instruction is a search request or an identification request;

when the instruction is a search request, determining a method of searching for the content of the received instruction;

dividing the searching method between normal search performed based on a condition such as shooting time range, shooting time or personal information of a candidate face and image search performed based on a condition such as image or image feature quantity;

in the case of the normal search request, searching out an image by sequentially determining whether or not each of data pieces on an unspecified person list matches the condition of the received normal search request, thereby retrieving, from the unspecified person list, a data piece that is left to a user's determination as to whether or not to be additionally registered, according to the condition of the received normal search request; in the case of the image request, processing of comparing an image feature quantity extracted from an image included in the condition with an image feature quantity of each of the data pieces on the unspecified person list and searching out an image having high similarity as determined based on the calculated image similarity, thereby making image search for retrieving, from the unspecified person list, a data piece that is left to the user's determination as to whether or not to be additionally registered, according to the condition of the received image search request;

extracting the data piece of interest from the unspecified person list thus searched;

transmitting the extracted data piece to the monitor terminal; and adding to the specified person list the personal information, the image feature quantity, the shooting time and like for the image of interest that is included in the identification request and on the unspecified person list.

* * * * *